(12) United States Patent
Munari

(10) Patent No.: US 8,484,805 B2
(45) Date of Patent: Jul. 16, 2013

(54) SYSTEM FOR ATTACHING AND RELEASING THE HANDLE OF A CONTAINER FOR COOKING FOOD

(75) Inventor: Marco Munari, Cardano al Campo (IT)

(73) Assignee: La Termoplastic F.B.M. S.R.L., Arsago Seprio (Varese) (IT)

(*) Notice: Subject to any disclaimer, the term of this patent is extended or adjusted under 35 U.S.C. 154(b) by 0 days.

(21) Appl. No.: 13/138,876

(22) PCT Filed: Apr. 19, 2010

(86) PCT No.: PCT/IB2010/000905
§ 371 (c)(1),
(2), (4) Date: Dec. 5, 2011

(87) PCT Pub. No.: WO2010/125437
PCT Pub. Date: Nov. 4, 2010

(65) Prior Publication Data
US 2012/0073085 A1    Mar. 29, 2012

(30) Foreign Application Priority Data
Apr. 27, 2009   (IT) .............................. MI2009A0713

(51) Int. Cl.
*A47J 45/07*   (2006.01)
(52) U.S. Cl.
USPC ................. 16/425; 16/422; 16/431; 220/753; 220/759
(58) Field of Classification Search
USPC .. 16/110.1, 422, 425, DIG. 24, 431; 220/762, 220/763, 753, 759, 769, 573.1, 912
See application file for complete search history.

(56) References Cited

U.S. PATENT DOCUMENTS

| | | | | |
|---|---|---|---|---|
| 2,205,819 | A * | 6/1940 | Mattoon | 220/753 |
| 4,577,367 | A * | 3/1986 | Durand | 220/759 |
| 5,887,751 | A * | 3/1999 | Kroscher | 220/759 |
| 6,079,590 | A * | 6/2000 | Munari | 220/762 |
| 6,257,439 | B1 * | 7/2001 | Hsu | 220/759 |
| 8,011,530 | B2 * | 9/2011 | Kutsch et al. | 220/762 |
| 8,261,414 | B2 * | 9/2012 | Coudurier | 16/422 |
| 8,302,807 | B2 * | 11/2012 | Baumgarten | 220/759 |

FOREIGN PATENT DOCUMENTS

| | | | |
|---|---|---|---|
| DE | 202004002507 | U1 * | 6/2004 |
| EP | 0 945 097 | | 9/1999 |
| EP | 1 925 244 | | 5/2008 |
| FR | 1 163 172 | | 9/1958 |
| FR | 2 049 388 | | 3/1971 |

OTHER PUBLICATIONS

PCT Search Report dated Aug. 9, 2010.

* cited by examiner

*Primary Examiner* — William L. Miller
(74) *Attorney, Agent, or Firm* — Hedman & Costigan, P.C.; James V. Costigan

(57) ABSTRACT

The invention describes a system (10) for attaching and releasing the handle of a container (14) for cooking food, in particular for a frying pan, comprising a base portion (12) and a handle portion (26) respectively provided with mutual attachment and release means (18, 20, 22; 28, 30, 32). Both the base portion (12) and the handle portion (26) as a whole are respectively made in a single piece from heat-resistant plastic material. The handle portion (26) as a whole is rotatable and removable with respect to the base portion (12) to obtain the attachment and/or release of the handle portion (26) with respect to the base portion (12) and thus with respect to the container (14) following the actuation of a release button (36) foreseen on the aforementioned handle portion (26) and capable of activating at least part of the aforementioned attachment means (18, 20, 22; 28, 30, 32).

14 Claims, 6 Drawing Sheets

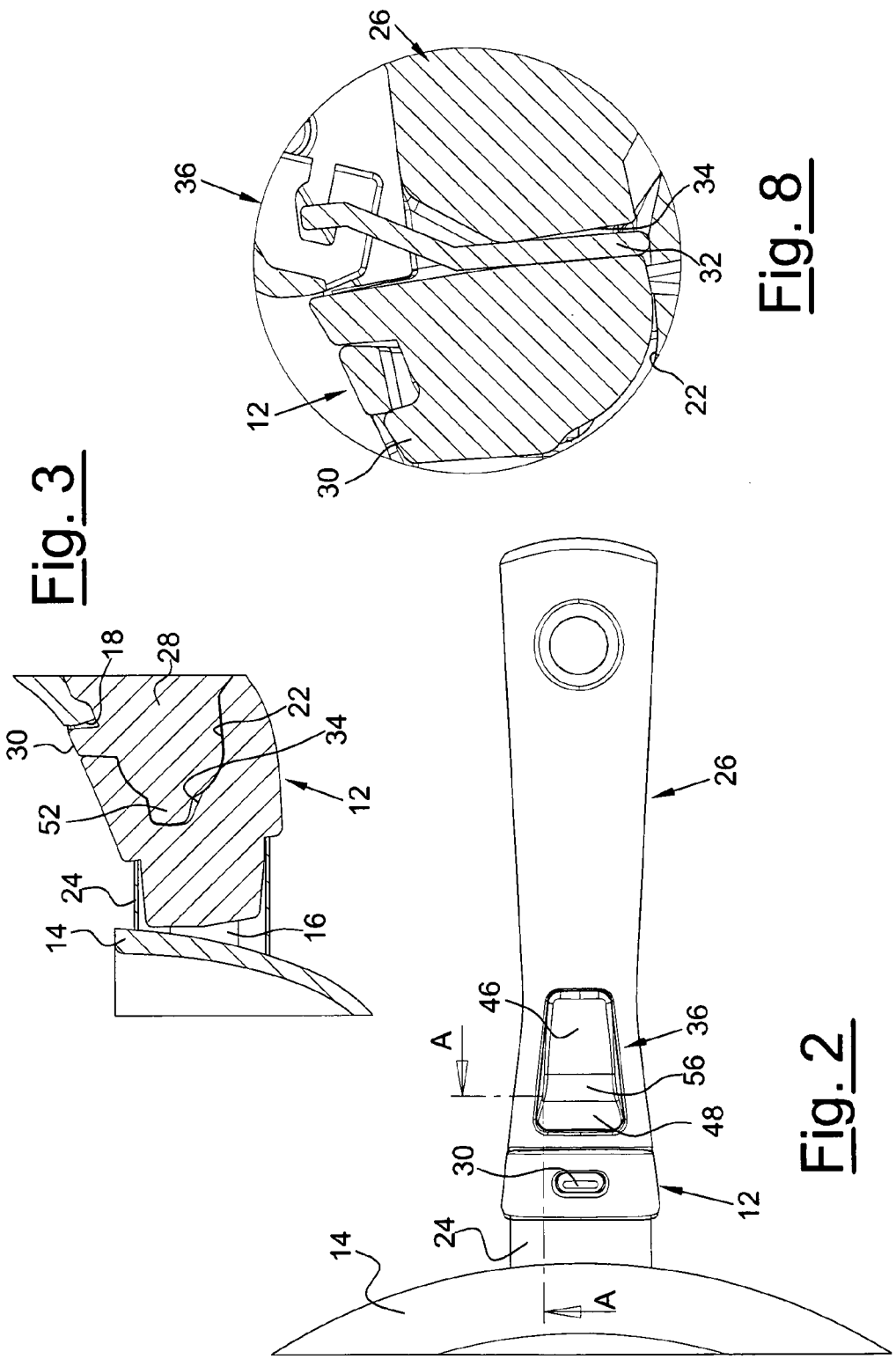

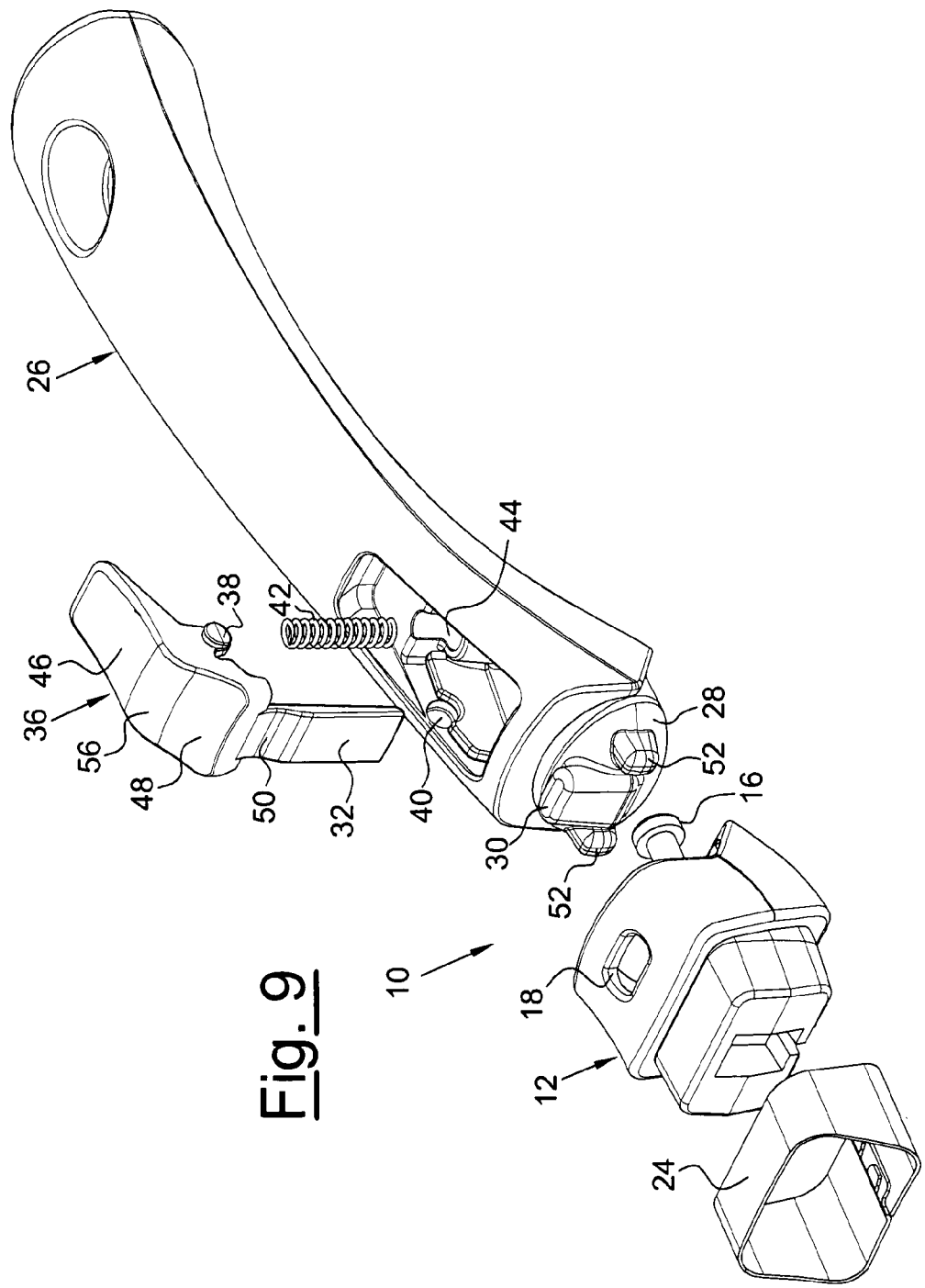

SYSTEM FOR ATTACHING AND RELEASING THE HANDLE OF A CONTAINER FOR COOKING FOOD

The present invention refers to a system for attaching and releasing the handle of a container for cooking food, in particular but not exclusively a frying pan.

As known, the most common containers intended for cooking food in general, like for example frying pans, saucepans and stewpans, are provided with handles that allow them to be easily held, even when the container is full and hot. In particular, frying pans are normally provided with a single elongated handle, preferably made from polymeric material, which extends radially canti-levered from the side wall of the frying pan and that is fixed to the latter through screws or rivets.

In order to reduce the overall space occupied by frying pans or by other similar containers, for example in the case in which they need to be placed in the refrigerator, inside ovens or else to be prepared for washing, numerous types of dismountable handles have been foreseen, provided with more or less complex means for attaching to and releasing from the side wall of the container. The presence of a detachable handle also gives further advantages, like for example the possibility of more easily manipulating the container, both in the transportation and storage steps and during use in the home, as well as the possibility of using the same handles for many different containers or, vice-versa, the possibility of changing the handles of the same container according to its intended use.

Therefore, there are numerous published patent documents that illustrate different types of removable handles for containers for cooking in general. However, in many cases, such removable handles according to the prior art have proven to be rather complicated both to manufacture and to use. Moreover, they are mainly handles that require coupling with specially made cooking containers, in other words provided with specific attachment means of the type not normally present on the market.

The general purpose of the present invention is therefore to make a system for attaching and releasing the handle of a container for cooking food, in particular but not exclusively a frying pan, which is able to solve the aforementioned drawbacks of the prior art in an extremely simple, cost-effective and particularly functional manner. In particular, a purpose of the present invention is to make a system for attaching and releasing the handle of a container for cooking food that allows simple, safe and intuitive use by the user, with a limited number of components.

Another purpose of the invention is to make a system for attaching and releasing the handle of a container for cooking food able to be adapted to saucepans, frying pans and other similar containers of the type already found on the market.

A further purpose of the invention is to make a system for attaching and releasing the handle of a container for cooking food that is particularly simple to use and cost-effective to manufacture.

These purposes according to the present invention are achieved by making a system for attaching and releasing the handle of a container for cooking food as outlined in claim 1.

Further characteristics of the invention are highlighted by the dependent claims, which are an integral part of the present description.

The characteristics and advantages of a system for attaching and releasing the handle of a container for cooking food according to the present invention shall become clearer from the following description, given as an example and not for limiting purposes, referring to the attached schematic drawings in which:

FIG. 2 is a plan view from above of the attaching and releasing system of FIG. 1, in a configuration mounted on a generic container for cooking food;

FIG. 3 is a section view obtained along the line A-A of FIG. 2;

FIG. 8 is an enlarged section view of the detail indicated with C in FIG. 7B; and FIG. 9 is an exploded view that illustrates all of the components of a second example embodiment of the system for attaching and releasing the handle of a container for cooking food according to the present invention.

Figure 1:
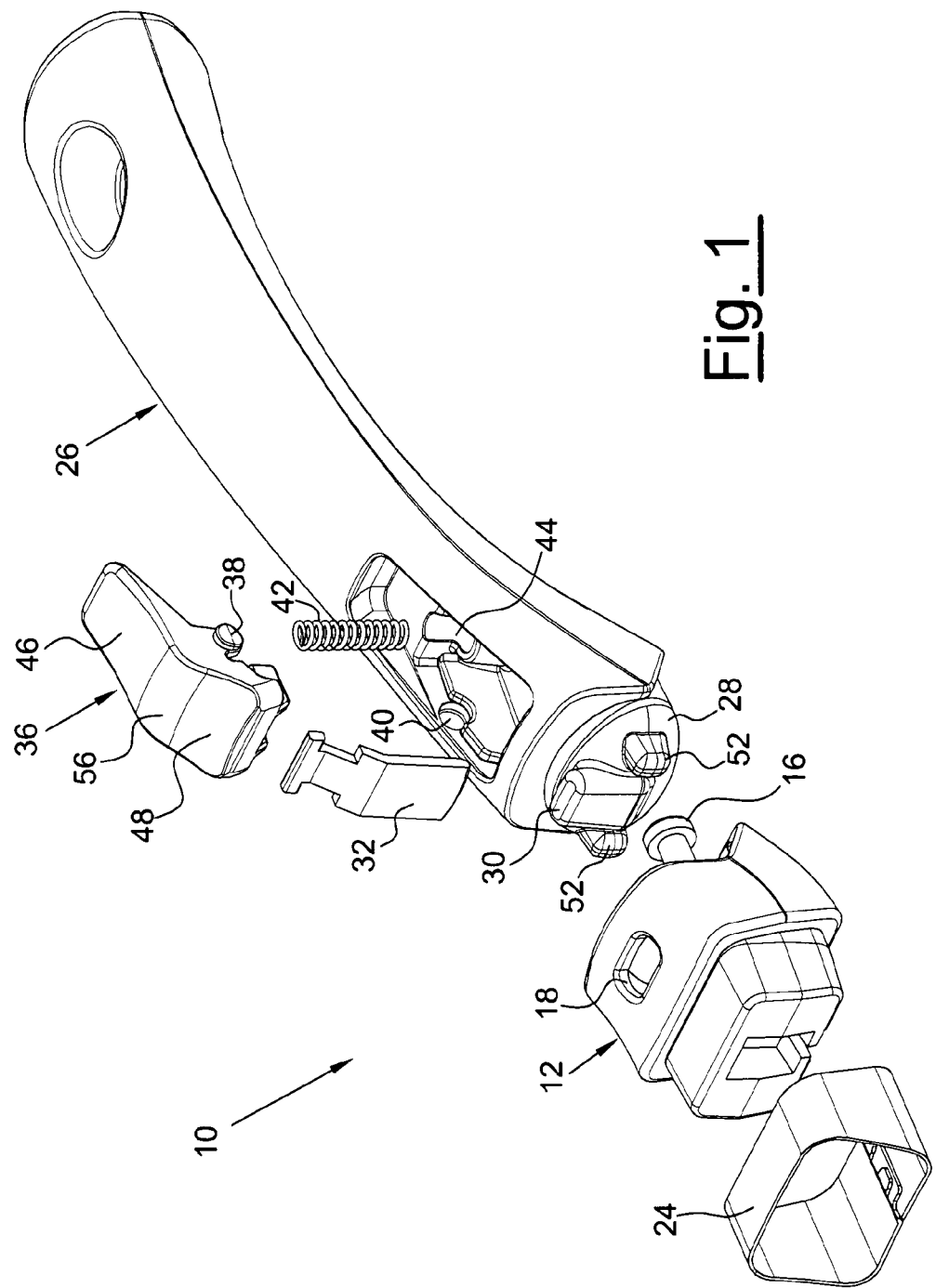
FIG. 1 is an exploded view that illustrates all of the components of a first example embodiment of the system for attaching and releasing the handle of a container for cooking food according to the present invention.

With reference to the figures, a system for attaching and releasing the handle of a container for cooking food made according to the present invention is shown, wholly indicated with reference numeral 10.

The system 10 firstly comprises a base portion 12 of the universal type, i.e. configured to be fixedly attached to the wall of a generic container 14 for cooking food (FIG. 2), like for example a frying pan, through fastening means 16. The base portion 12 is advantageously made in a single piece from heat-resistant plastic material, configured to withstand temperatures of up to about 240° C. and thus being suitable for use inside any kind of oven or dishwasher.

Figure 4:
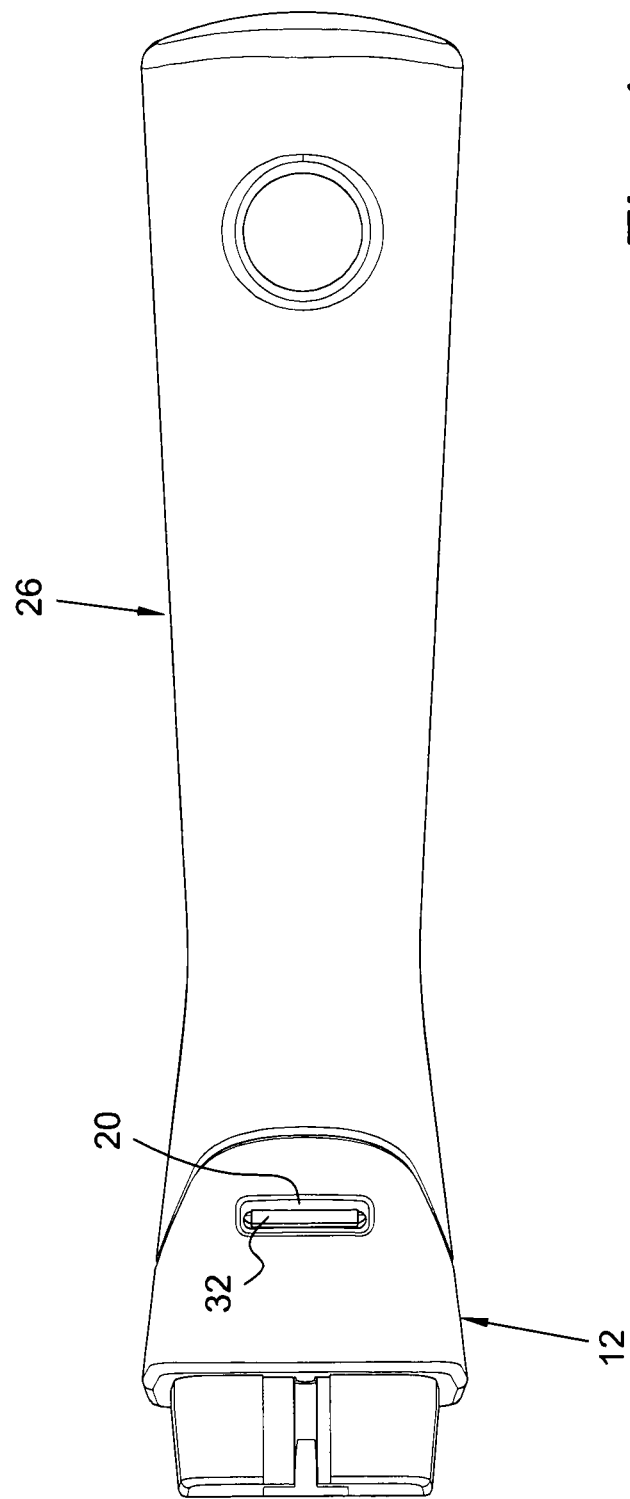
FIG. 4 is a plan view from below of the attaching and releasing system of FIG. 1.

The base portion 12 is internally hollow and thus comprises at least one first upper attachment means 18 and at least one second lower attachment means 20 (FIG. 4), made in the form of holes, passing straight through or not, arranged in communication with an inner cavity 22 (FIG. 3) of the base portion 12 itself.

The fastening means 16 are substantially of the type known in the state of the art and can, like in the example embodiments illustrated, consist of a single screw or rivet that houses in the inner cavity 22 of the base portion 12 and from which it protrudes to engage, again in a per sé known manner, with the container 14. Since the screw 16, or other similar fastening means, is the only connection element between the system 10 as a whole and the container 14, it is clear that such a system 10 can be combined with any type of known container existing on the market, without it having to be provided with specific attachment portions.

The base portion 12 can finally be provided with a ring nut 24, preferably metallic, suitable for making a shape coupling between the base portion 12 itself and the outer side wall, usually convex, of the container 14 on which such a base portion 12 is attached.

The system 10 also comprises a handle portion 26, which can be shaped in any way but that preferably has an arched and elongated shape to allow the container 14 to be easily held, especially when it consists of a frying pan with a large diameter and when the handle 26 is the only means by which to hold it. The handle 26 is also advantageously made with a heat-resistant plastic material, which may or may not be identical to the material from which the base portion 12 is made, and comprises an end projection 28 configured to be shape coupled with the inner cavity 22 of the base portion 12, as shown in the section view of FIG. 3. The end projection 28 is formed in a single piece with the handle 26 and in turn comprises, made in a single piece with it, at least one fixed fastening means 30, in the form of a tooth, configured to be engaged with the first upper attachment means 18, in the form of a hole, of the base portion 12. Inside the handle 26 there is therefore at least one mobile fastening means 32, configured to be removably engaged with the second lower attachment means 20 of the base portion 12. The mobile fastening means 32, made in the form of a tongue that moves by translating inside a suitable channel 34 (FIG. 8) made in the handle 26 at its end projection 28, is controlled in its movement by a release button 36. The release button 36 is in turn provided with rotation means with respect to the handle 26, for example consisting of a pair of opposite side pins 38 that house in suitable seats 40 formed inside the handle 26 itself.

The release button 36 is also connected in a mobile way to the handle 26 through an elastic element 42, like for example a torsion spring operating by compression. Based on the illustrated example embodiments, the torsion spring 42 is inserted by interference, at an end thereof, in a blind hole 44 made in the handle 26.

In detail, the release button 36 has a first front portion 46, arranged downstream of the respective rotation means 38 and 40 with reference to the position of the container 14, and a second rear portion 48, arranged upstream of the respective rotation means 38 and 40 again with reference to the position of the container 14. The front portion 46 of the release button 36 is connected in a mobile way to the handle 26 through the torsion spring 42, whereas the rear portion 48 is rotatably connected to the tongue 32.

Based on the first example embodiment of the system 10, shown in FIGS. 1-8, the release button 36 and the tongue 32 are two separate components, with the tongue 32, manufactured from metallic material, hinged at the rear portion 48 of the release button 36 made from plastic material (FIG. 8). With reference, on the other hand, to the second example embodiment of the system 10, shown in FIG. 9, the release button 36 and the tongue 32 are made in a single piece, from plastic or metallic material, and they are provided with a flexible contact wall 50 that allows its reciprocal rotary movement.

When the attaching and releasing system 10 is in use configuration or, in other words, when the handle 26 is connected to the base portion 12 and, consequently, to the container 14 (FIGS. 5A and 7A), the release button 36 is kept by the elastic element 42 in an operative position in which the tongue 32 engages the second lower attachment means 20 of the base portion 12, whereas the fastening tooth 30 is in turn engaged in the first upper attachment means 18 of the base portion 12 itself. Preferably, in order to make the coupling between handle 26 and base portion 12 more stable in the configuration of use of the system 10, on the end projection 28 of said handle 26 there can also be, formed in a single piece with the end projection 28 of the handle 26 itself, one or more further projections 52 that engage by shape coupling inside corresponding recesses 54 made inside the inner cavity 22 of the base portion 12, as shown in the section view of FIG. 3.

The elastic element 42 can be elastically deformed by actuating the release button 36 through application of a certain pressure on its front portion 46. The presence on the release button 36, between its front portion 46 and its rear portion 48, of a protrusion 56 can be useful to indicate to the user the need to act upon said front portion 46, closest to the grip of the handle 26, instead of upon said rear portion 48, facing towards the pan, with a clear benefit in terms of safety.

The actuation of the release button 36, which rotates around its own rotation means 38 and 40, thus causes the tongue 32 to left and consequently to disengage from the second lower attachment means (hole) 20 of the base portion 12. At this point it is therefore possible to begin to rotate the handle 26 with respect to the base portion 12 in the direction indicated by the arrow A of FIGS. 5B and 7B.

Figure 5A:
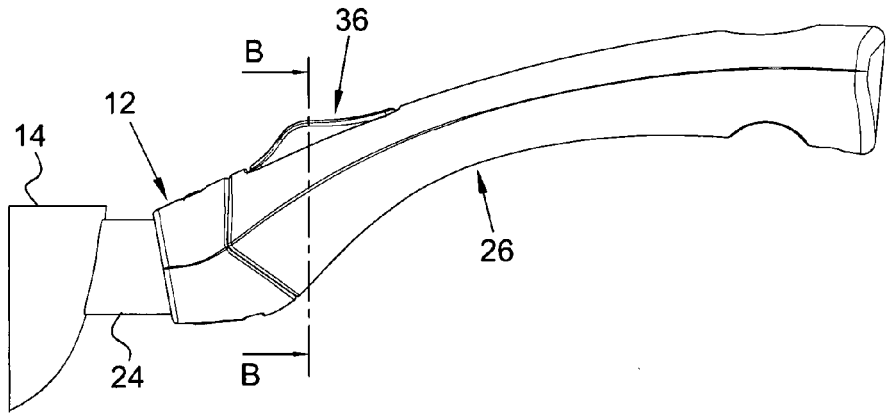
FIGS. 5A-5C show the different operative steps of use of the attaching and releasing system of FIG. 1.
Figure 5B:
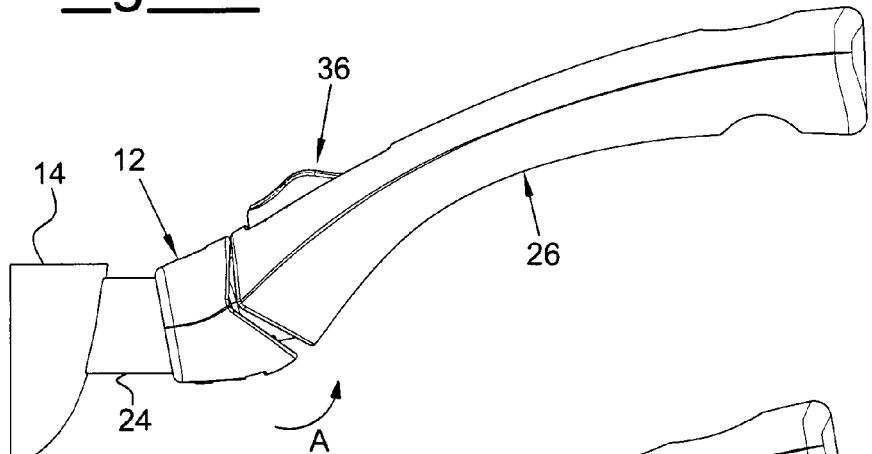
Figure 5C:
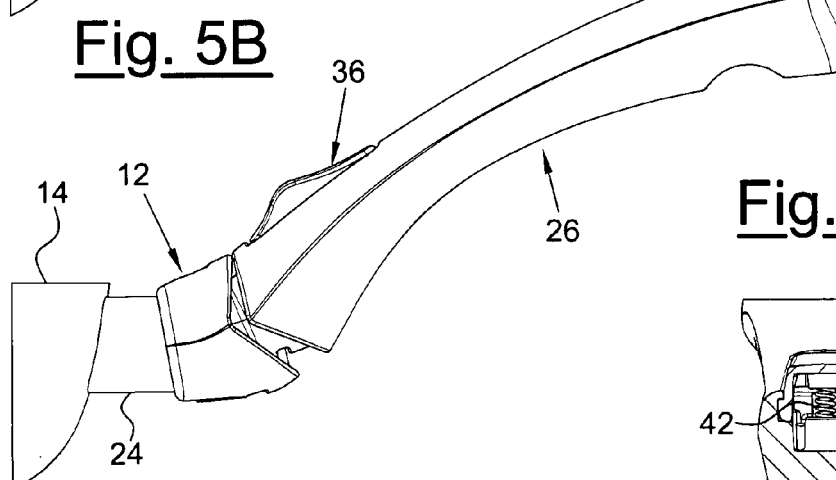
Figure 6:
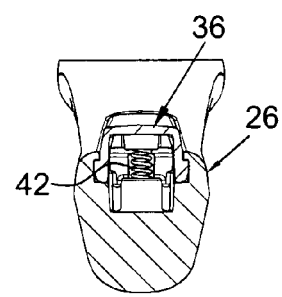
FIG. 6 is a section view obtained along the line B-B of FIG. 5A.
Figure 7A:
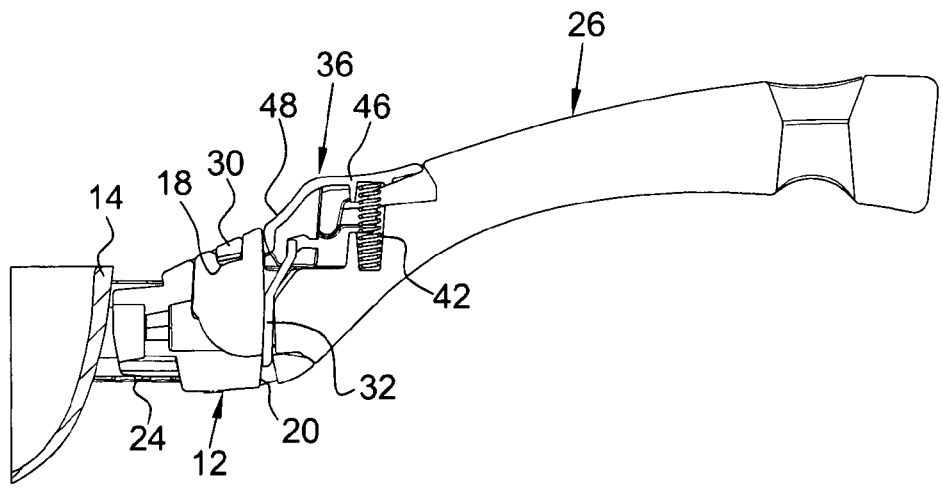
FIGS. 7A-7C show section views of the same operative steps respectively illustrated in FIGS. 5A-5C.
Figure 7B:
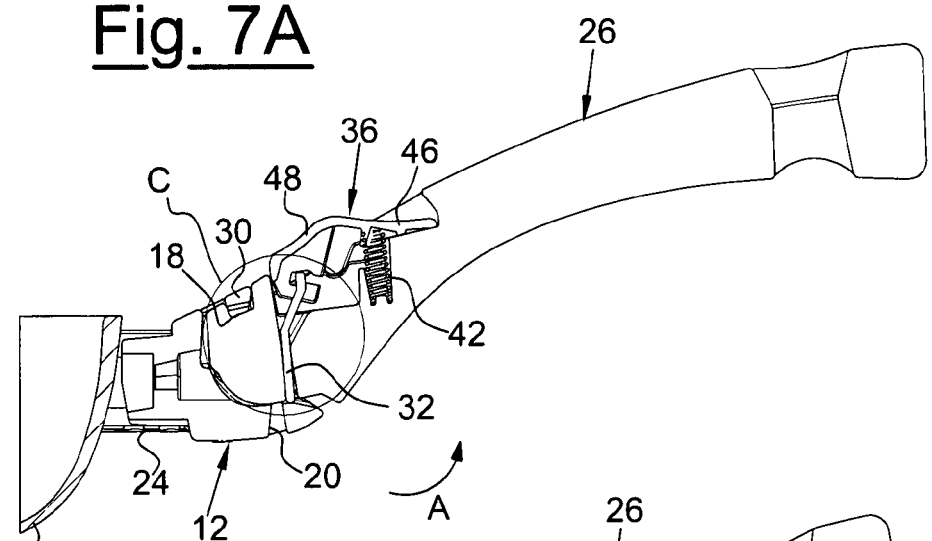
Figure 7C:
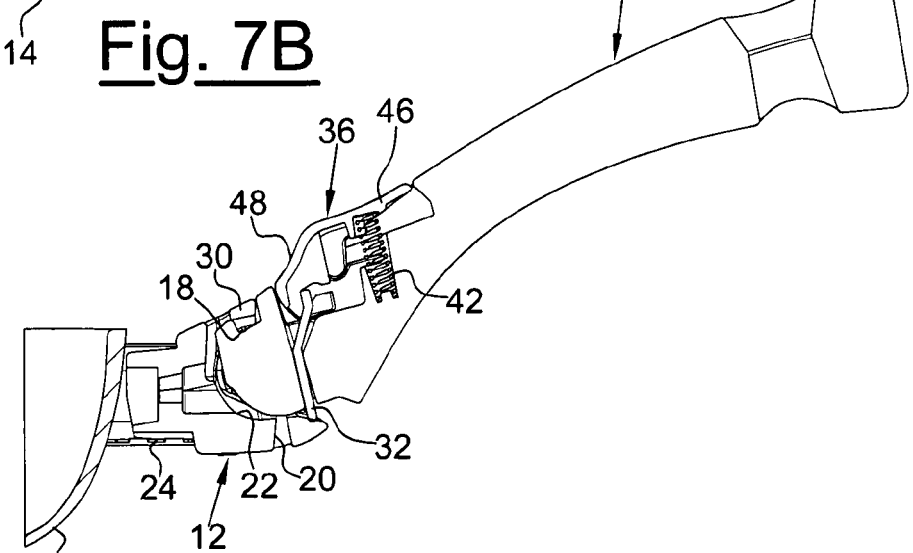

Once the tongue 32 has been disengaged from the hole 20 of the base portion 12 it is possible to release the release button 36, but continuing with the relative rotation of the handle 26 with respect to the base portion 12 in order to also disengage the tooth 30 from the first upper attachment means (hole) 18 of the base portion 12 (FIGS. 5C and 7C). It has thus been possible to completely remove the handle 26 from the respective base portion 12.

The same operations described above, carried out in reverse, on the other hand, will allow the handle 26 to be reattached, again in an easy and intuitive manner, to the respective base portion 12. It should however be noted that, in the attachment operation of the handle 26 to the base portion 12, it is not necessary to actuate the release button 36, since the coupling between the tongue 32 and the hole 20 of the base portion 12 itself can be by a catch, thanks to the elastic properties of the torsion spring 42. All of this is clearly to the benefit of the practicality and speed of use of the system 10.

It has thus been seen that the system for attaching and releasing the handle of a container for cooking food according to the present invention achieves the purposes highlighted earlier.

The system for attaching and releasing the handle of a container for cooking food of the present invention thus conceived can in any case undergo numerous modifications and variants, all of which are covered by the same inventive concept; moreover, all of the details can be replaced by technically equivalent elements.

The scope of protection of the invention is therefore defined by the attached claims.

The invention claimed is:

1. System (10) for attaching and releasing the handle of a container (14) for cooking food, comprising:
   a base portion (12), configured to be fixedly attached, through fastening means (16), to a wall of said container (14), said base portion (12) comprising at least one first upper attachment means (18) and at least one second lower attachment means (20), arranged in communication with an inner cavity (22) of said base portion (12),
   a handle portion (26), comprising an end projection (28) configured to be shape coupled with said inner cavity (22) of the base portion (12), said end projection (28) in turn comprising at least one fixed fastening means (30) configured to be engaged with said first upper attachment means (18) of the base portion (12),
   at least one mobile fastening means (32), arranged inside the handle portion (26) and configured to be removably engaged with said second lower attachment means (20) of the base portion (12),
   a release button (36) capable of activating said mobile fastening means (32), said release button (36) being provided with rotation means (38, 40) with respect to the handle portion (26) and being also connected in a mobile way to the handle portion (26) through an elastic element (42), characterized in that said base portion (12) is made in a single piece from heat-resistant plastic material and in that said handle portion (26), said end projection (28) and said fixed fastening means (30) are made in a single piece from heat-resistant plastic material, said handle portion (26) as a whole being rotatable and removable with respect to said base portion (12) to obtain the attachment and/or the release of said handle portion (26) with respect to said container (14) following the actuation of said release button (36) wherein said mobile fastening means (32) is made in the form of a tongue that moves by translating inside a suitable channel (34) made in the handle portion (26) at said end projection (28).

2. System (10) according to claim 1, characterized in that said release button (36) has a first front portion (46), arranged downstream of the respective rotation means (38, 40) with reference to the position of the container (14), and a second rear portion (48), arranged upstream of the respective rotation means (38, 40) again with reference to the position of the container (14), said front portion (46) being connected in a mobile way to the handle portion (26) through said elastic element (42) and said rear portion (48) being rotatably connected to said tongue (32).

3. System (10) according to claim 2, characterized in that said release button (36) and said tongue (32) are two separate components, said tongue (32) being hinged at said rear portion (48) of the release button (36).

4. System (10) according to claim 3, characterized in that said tongue (32) is made from metallic material and in that said release button (36) is made from plastic material.

5. System (10) according to claim 2, characterized in that said release button (36) and said tongue (32) are made in a single piece, from plastic or metallic material, and are provided with a flexible contact wall (50) that allows their reciprocal rotary movement.

6. System (10) according to claim 2, characterized in that said release button (36) is provided, between its front portion (46) and its rear portion (48), with a protrusion (56) useful to indicate to the user the need to act upon said front portion (46) to obtain the attachment and/or the release of said handle portion (26) with respect to said container (14).

7. System (10) according to claim 1, characterized in that said rotation means (38, 40) of the release button (36) consist of a pair of opposite side pins (38) that house in suitable seats (40) formed inside the handle portion (26).

8. System (10) according to claim 1, characterized in that said elastic element (42) is made in the form of a torsion spring operating by compression, inserted by interference, at an end thereof, in a blind hole (44) made in the handle portion (26).

9. System (10) according to claim 1, characterized in that said first upper attachment means (18) of the base portion (12) is made in the form of a through hole.

10. System (10) according to claim 1, characterized in that said second lower attachment means (20) of the base portion (12) is made in the form of a through hole.

11. System (10) according to claim 1, characterized in that said fixed fastening means (30) of the end projection (28) of the handle portion (26) is made in the form of a tooth.

12. System (10) according to claim 1, characterized in that on said end projection (28) of the handle portion (26), formed in a single piece with said end projection (28), there are one or more further projections (52) that engage by shape coupling inside of corresponding recesses (54) made inside said inner cavity (22) of the base portion (12).

13. System (10) according to claim 1, characterized in that said fastening means (16) consist of a single screw or rivet, which is housed in said inner cavity (22) of the base portion (12) and from which it protrudes to engage with said container (14).

14. System (10) according to claim 1, characterized in that said base portion (12) is provided with a ring nut (24) suitable for making a shape coupling between said base portion (12) and the outer side wall of the container (14) on which said base portion (12) is attached.

* * * * *